United States Patent [19]
Bankhead

[11] Patent Number: 6,068,116
[45] Date of Patent: May 30, 2000

[54] STORAGE ASSEMBLY FOR RECORDED MEDIA

[76] Inventor: Leonard Bankhead, 130 Spruce, Apt. 207, Wyandotte, Mich. 48192

[21] Appl. No.: 09/177,445

[22] Filed: Oct. 22, 1998

Related U.S. Application Data

[60] Provisional application No. 60/062,746, Oct. 23, 1997.

[51] Int. Cl.[7] .................................................. B65D 69/00
[52] U.S. Cl. ..................... 206/232; 206/308.1; 206/312
[58] Field of Search ............................... 206/232, 308.1, 206/309, 311, 312, 313, 472

[56] References Cited

U.S. PATENT DOCUMENTS

| | | | |
|---|---|---|---|
| 4,709,812 | 12/1987 | Kosterka | 206/311 |
| 4,717,021 | 1/1988 | Ditzig | 206/472 |
| 4,850,731 | 7/1989 | Youngs | 206/311 |
| 5,114,009 | 5/1992 | Johnston | 206/472 |
| 5,168,991 | 12/1992 | Whitehead et al. | 206/310 |
| 5,501,327 | 3/1996 | Cox | 206/308.1 |
| 5,518,488 | 5/1996 | Schluger | 493/82 |
| 5,542,531 | 8/1996 | Yeung | 206/308.1 |
| 5,593,030 | 1/1997 | Tell | 206/308.1 |
| 5,669,491 | 9/1997 | Pettey | 206/232 |
| 5,685,424 | 11/1997 | Rozek et al. | 206/312 |
| 5,772,019 | 7/1998 | Reed | 206/308.1 |

*Primary Examiner*—David T. Fidei
*Attorney, Agent, or Firm*—Bliss McGlynn, P.C.

[57] ABSTRACT

A storage assembly for a recorded media includes a first cover, a second cover and a third cover. The first cover is hinged to the second cover by a first hinge, and the third cover hinged to the second cover by a second hinge, to allow relative pivotable movement between the first, second and third covers. The storage assembly includes a first printed insert fixedly attached to either one of the first hinge or second hinge, and a carrier mechanism for supporting the recorded media positioned on an inside surface of either one of the first cover, the second cover or the third cover.

16 Claims, 2 Drawing Sheets

US 6,068,116

STORAGE ASSEMBLY FOR RECORDED MEDIA

CROSS-REFERENCE TO RELATED APPLICATIONS

The present invention claims the priority date of co-pending U.S. Provisional Application Serial No. 60/062,746, filed Oct. 23, 1997.

BACKGROUND OF THE INVENTION

1. Field of the Invention

The present invention relates generally to recorded media and, more specifically, to a storage assembly for recorded media.

2. Description of the Related Art

In the past, the entertainment industry, and in particular the music industry, produced recorded media generally available in a record album format. The record album was stored inside a storage container referred to as a record album jacket, as is well known. Dimensionally, the record album jacket is approximately 12⅜ inches square. Typically, the front cover of the record album jacket portrays an artistic image relating to the record album, and the back cover of the record album jacket includes further artistic imagery, as well as other information relating to the record album. Additionally, the record album jacket may fold-out along a hinge with artistic imagery on the inside.

Recorded media is now generally available in a newer format of a digitally encoded optical disc, particularly for video, audio or CD-ROM. For example, the music industry produces audio discs, commonly referred to as a compact disc (CD). Likewise the movie industry produces video discs, commonly referred to as digital video disc (DVD). The entertainment industry has established a configuration and dimensional convention for recorded media, such as a CD, or DVD. Likewise, the entertainment industry has adopted a standard convention for a package to display and store a CD. An example of a package for a CD is a jewel case. The typical jewel case may include a hinged upper card lower cover member, and a carrier disposed therebetween to retain or support the CD. In a display position, the upper and lower cover member are open and lie in the same plane. The jewel case for a single CD measures approximately 4⅞ high by 5⁹⁄₁₆" wide. An example of a package for a DVD is a carrier disposed within a jacket. The DVD jacket measures approximately 5½" high by 7¾" wide.

The jewel case or DVD jacket may also include a printed insert, such as a booklet. The booklet may be removable from the jewel case, or DVD jacket, or it may have an edge hinged to the cover member. Similar to a record album jacket cover, the booklet includes artistic imagery, describes the contents of the disc, or otherwise provides information regarding the performer.

A limitation of the above-identified jewel case or DVD jacket is that its reduced size limits the amount of information that can be provided. Another limitation of the jewel case or Dr jacket is that the creativity of the cover art may be compromised. Therefore, there is a need in the art for a storage assembly that makes more information available regarding the recorded media stored within.

SUMMARY OF THE INVENTION

It is, therefore, one object of the present invention to provide a storage assembly for recorded media.

It is another object of the present invention to provide a storage assembly that includes more information regarding the recorded media stored within.

It is yet another object of the present invention to provide a storage assembly that is economical to produce.

To achieve the foregoing objects, the present invention is a storage assembly for a recorded media that includes a first cover, a second cover and a third cover. The first cover is hinged to a second cover by a first hinge, and a third cover hinged to the second cover by a second hinge, to allow relative pivotable movement between the first, second and third covers. The storage assembly includes a first printed insert fixedly attached to either one of: the first hinge or second hinge, and a carrier mechanism positioned on an inside surface of either one of the first cover, second cover, or third cover, for supporting the recorded media.

One advantage of the present invention is that the storage assembly for recorded media is larger than a jewel case. Another advantage of the present invention is that the storage assembly has a larger size and a printed insert which provides greater information regarding the recorded media. Yet another advantage of the present invention is that the storage assembly is of a cardboard material so that it is more economical to produce.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
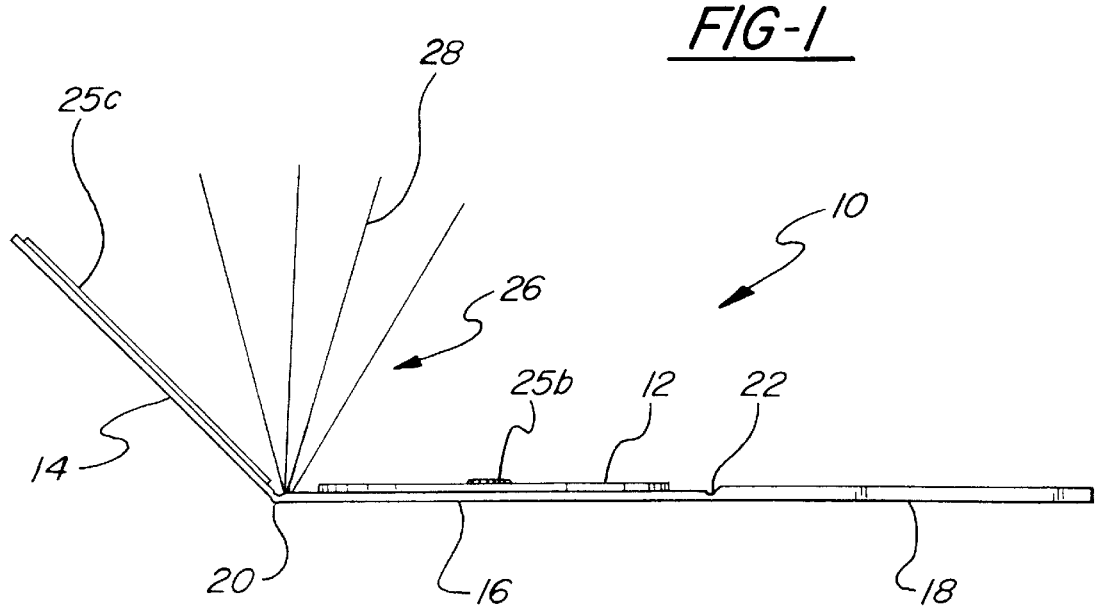
FIG. 1 is an elevational view of a storage assembly for a recorded media, according to the present invention.
Figure 2:
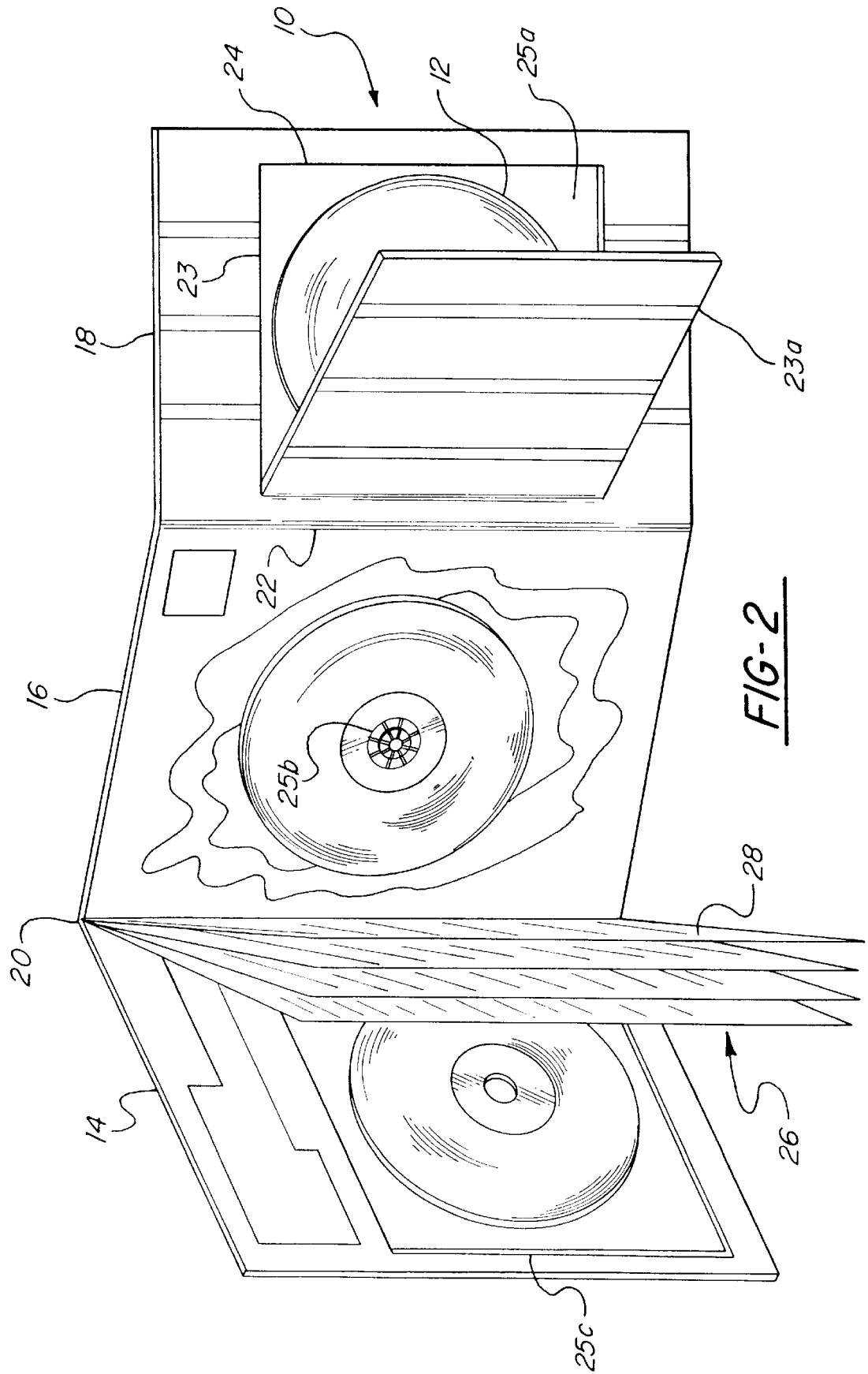
FIG. 2 is a perspective view of the storage assembly of FIG. 1.

Referring to FIG. 1 and FIG. 2, a storage assembly 10 for a recorded media 12 is illustrated in an open position. It should be appreciated that the recorded media 12, in this example, is of the type commonly referred to in the art as a compact disc (CD). The storage assembly 10 includes a first cover 14, a second cover 16, and a third cover 18. The storage assembly 10 also includes a first hinge 20 interconnecting the first and second covers 14, 16, and a second hinge 22 interconnecting the second and third covers 16, 18 to provide relative pivotable movement between the first, second and third covers 14, 16, 18. Preferably, the first hinge 20 is a living hinge integrally formed with the first and second cover 14, 16 and the second hinge 22 is a living hinge integrally formed with the second and third cover 16, 18 respectively, so that the storage assembly 10 is integral, unitary and formed as one-piece.

The overall size of the storage assembly 10 can be scaled to accommodate the recorded media 12 stored therein. For example, for a compact disc, the storage assembly 10 may measure 24" by 8" in a fully unfolded position and 8" by 8" in a closed position. Alternatively, the storage assembly 10 for a recorded media such as DVD may measure 5½" by 7¾" in a closed position, and 16½"×7¾" in a fully unfolded position. The first, second and third covers 14, 16, 18 are made from a rigid material, such as cardboard, that is of sufficient rigidity and strength to protect the recorded media 12 stored within. Preferably, an outside surface or an inside surface of the first, second and third cover 14, 16, 18 exhibits artistic imagery pertaining to the recorded media.

As shown best in FIG. 2, the inside surface of the first, second and third cover 14, 16, 18 may include a cut-out portion 23 for receiving a carrier mechanism 24, to be described. It should be appreciated that, in this example, the cut-out portion 23 forms a flap 23a that is hingedly attached to the inside surface. In a closed position, the flap 23a is integral and one-piece with the inside surface.

The carrier mechanism 24 supports or retains the recorded media 12. The carrier mechanism 24 is positioned on either one of the inside surfaces of the first cover 14, second cover 16 or third cover 18. It should be appreciated that, in this example, the carrier mechanism 24 is fixedly retained to an inside surface of either one of the first cover 14, second cover 16 or, third cover 18, such as by an adhesive. One example of a carrier mechanism 24, known in the art, is a tray 25a. Preferably, the tray 25a is rectangular. The tray 25a has an indentation conforming in shape to the recorded media 12. The tray 25a may include a retaining mechanism 25b such as a raised bump, for holding the recorded media 12 in the tray 25a. Another example of a carrier mechanism 24, well known in the art, is a sleeve 25c fixedly retained to an inside surface of the first, second, or third cover 14, 16, 18. In still another example, the carrier mechanism 24 is a jewel case 25d (shown in FIG. 3) that is removably retained within the inside surface of the first, second, or third cover 14, 16, 18.

The storage assembly 10 also includes a first printed insert 26, such as a booklet that may or may not be removable. It should be appreciated that, in this example, the printed insert 26 is fixedly retained to either one of the first hinge 20 or the second hinge 22, such that a page 28 of the printed insert 26 is easily accessible. The printed insert 26 includes information, for example, such as a description of the contents of the recorded media 12 or a biography of the recording artist.

To close the storage assembly 10, preferably the first cover 14 is rotated until the inside surface of the first cover 14 rests against the inside surface of the second cover 16. The third cover 18 is rotated until the inside surface of the third cover 18 rests against an outside surface of the first cover 14. Alternatively, the third cover 18 is rotated until the inside surface of the third cover 18 rests against the inside surface of the second cover 16, and the first cover 14 is rotated until the inside surface of the first cover 14 rests against an outside surface of the third cover 18. To open the storage assembly 10, the first cover 14 and third cover 18 are unfolded.

Figure 3:
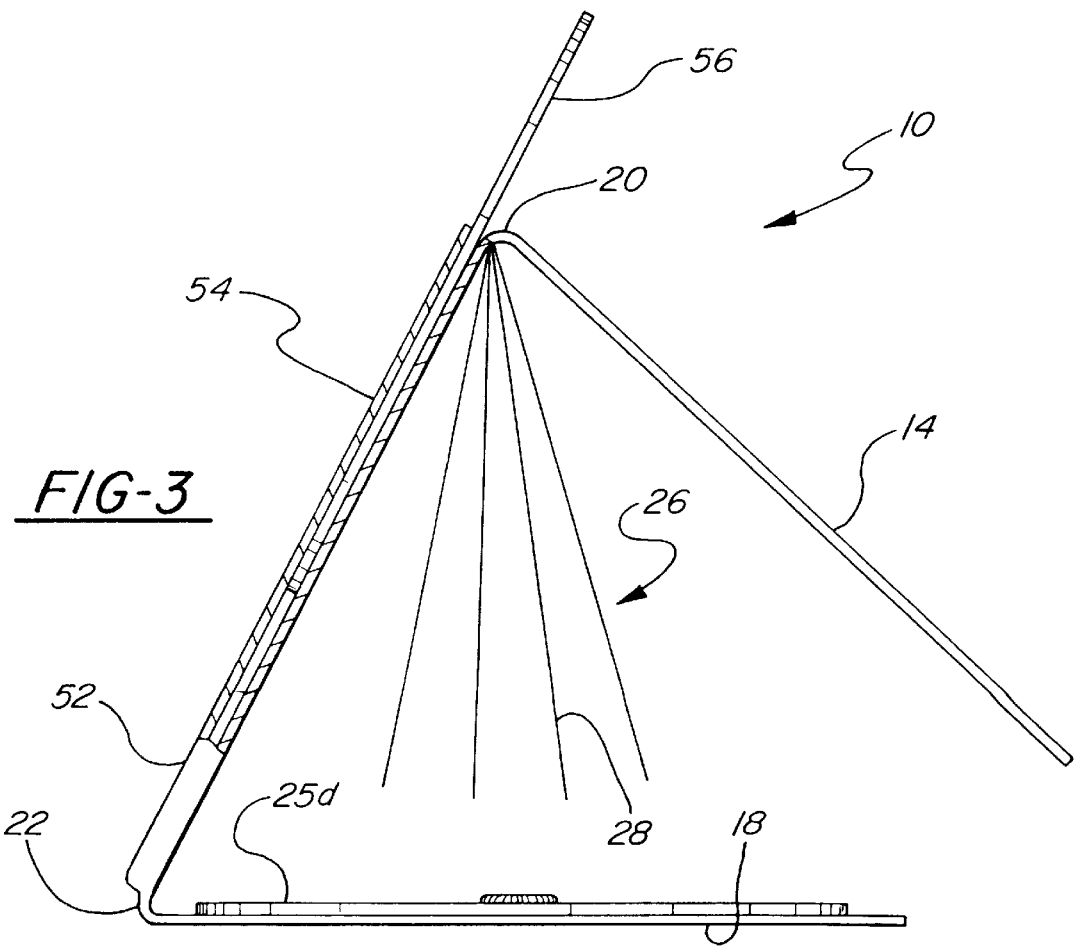
FIG. 3 is an elevational view of the storage assembly of FIG. 1 illustrating partial folding.

Referring to FIG. 3, ones example of a pocket 54 for holding a second printed insert 56 is illustrated. It should be appreciated that parts of the storage assembly 10 have like reference numerals. Preferably, the second cover 52 includes the pocket 54. The pocket 54 provides storage for the second printed insert 56, such as a card. The card 56 is removable, for example, by pulling it out of the pocket 54. The card 56 provides a further opportunity to disseminate information.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A storage assembly for a recorded media comprising:
   a first cover, a second cover and a third cover;
   wherein said second cover is hingedly attached to said first cover by a first hinge;
   wherein said third cover is hingedly attached to said second cover by a second hinge;
   wherein said first hinge and said second hinge provide relative pivotable movement between said first cover, said second cover and said third cover;
   a first printed insert comprising a booklet attached to either one of said first hinge or said second hinge;
   a carrier mechanism for supporting the recorded media positioned on an inside surface of either one of said first cover, said second cover or said third cover;
   said storage assembly being made from cardboard;
   a pocket within either one of said first cover, said second cover or said third cover; and
   a second printed insert removably stored within said pocket.

2. A storage assembly as set forth in claim 1 wherein said inside surface of either one of said first cover, said second cover or said third cover includes a cut-out portion for receiving said carrier mechanism.

3. A storage assembly as set forth in claim 2 wherein said cut-out portion includes a flap that is hingedly attached.

4. A storage assembly according to claim 1 wherein said carrier mechanism is fixedly retained to said inside surface of either one of said first cover, said second cover or said third cover.

5. A storage assembly according to claim 1 wherein said carrier mechanism is removable.

6. A storage assembly for a recorded media comprising:
   a first cover, a second cover and a third cover;
   wherein said second cover is hingedly attached to said first cover by a first hinge;
   wherein said third cover is hingedly attached to said second cover by a second hinge;
   wherein said first hinge and said second hinge provide relative pivotable movement between said first cover, said second cover and said third cover;
   a first printed insert comprising a booklet attached to either one of said first hinge or said second hinge;
   a pocket within either one of said first cover, said second cover or said third cover;
   a second printed insert removably stored within said pocket; and
   a carrier mechanism for supporting the recorded media positioned on an inside surface of either one of said first cover, said second cover or said third cover.

7. A storage assembly according to claim 6 wherein the storage assembly is made from cardboard.

8. A storage assembly according to claim 7 wherein said carrier mechanism is a tray fixedly retained to said inside surface of either one of said first cover, said second cover or said third cover.

9. A storage assembly according to claim 7 wherein said carrier mechanism is a sleeve fixedly retained to said inside surface of either one of said first cover, said second cover or said third cover.

10. A storage assembly, according to claim 7 wherein said carrier mechanism is removable.

11. A storage assembly as set forth in claim 7 wherein said inside surface of either one of said first cover, said second cover or said third cover includes a cut-out portion for receiving said carrier mechanism.

12. A storage assembly as set forth in claim 11 wherein said cut-out portion includes a flap that is hingedly attached.

13. A storage assembly for a recorded media comprising:

a first cover, a second cover and a third cover;

wherein said second cover is hingedly attached to said first cover by a first hinge;

wherein said third cover is hingedly attached to said second cover by a second hinge;

wherein said first hinge and said second hinge provide relative pivotable movement between said first cover, said second cover and said third cover;

a first printed insert comprising a booklet attached to either one of said first hinge or said second hinge;

a pocket within either one of said first cover, said second cover or said third cover;

a second printed insert removable stored within said pocket;

a carrier mechanism for supporting the recorded media positioned on an inside surface of either one of said first cover, said second cover or said third cover; and said inside surface of either one of said first cover, said second cover or said third cover includes a cut-out portion for receiving said carrier mechanism and said cut-out portion includes a flap covering said cut-out portion that is hingedly attached.

14. A storage assembly according to claim 13 wherein the storage assembly is made from cardboard.

15. A storage assembly according to claim 14 wherein said carrier mechanism is a tray fixedly retained to said inside surface of either one of said first cover, said second cover or said third cover.

16. A storage assembly according to claim 14 wherein said carrier mechanism is removable.

* * * * *